United States Patent
Yokoyama et al.

(10) Patent No.: US 10,252,673 B2
(45) Date of Patent: Apr. 9, 2019

(54) VEHICLE MIRROR DEVICE

(71) Applicant: KABUSHIKI KAISHA TOKAI-RIKA-DENKI-SEISAKUSHO, Aichi (JP)

(72) Inventors: Kazuyuki Yokoyama, Aichi (JP); Masatsugu Ohashi, Aichi (JP); Masahiro Arai, Aichi (JP)

(73) Assignee: KABUSHIKI KAISHA TOKAI-RIKA-DENKI-SEISAKUSHO, Aichi (JP)

( * ) Notice: Subject to any disclaimer, the term of this patent is extended or adjusted under 35 U.S.C. 154(b) by 0 days.

(21) Appl. No.: 15/122,855

(22) PCT Filed: Feb. 20, 2015

(86) PCT No.: PCT/JP2015/054851
§ 371 (c)(1),
(2) Date: Aug. 31, 2016

(87) PCT Pub. No.: WO2015/137095
PCT Pub. Date: Sep. 17, 2015

(65) Prior Publication Data
US 2017/0066376 A1    Mar. 9, 2017

(30) Foreign Application Priority Data
Mar. 12, 2014    (JP) .................. 2014-049285

(51) Int. Cl.
*B60R 1/02*    (2006.01)
*B60R 1/072*    (2006.01)
*B60R 1/08*    (2006.01)

(52) U.S. Cl.
CPC .............. *B60R 1/025* (2013.01); *B60R 1/072* (2013.01); *B60R 1/081* (2013.01)

(58) Field of Classification Search
None
See application file for complete search history.

(56) References Cited

U.S. PATENT DOCUMENTS 4,718,756 A * 1/1988 Lancaster ............... B60R 1/081
                                                      359/855
5,946,150 A * 8/1999 Liao ....................... B60R 1/081
                                                      248/467

(Continued)

FOREIGN PATENT DOCUMENTS

CN    202163359 U    3/2012
JP    S61-81443 U    5/1986

(Continued)

OTHER PUBLICATIONS

International Search Report issued in a corresponding application PCT/JP2015/054851 dated Apr. 28, 2015.

(Continued)

*Primary Examiner* — Jennifer D. Carruth
(74) *Attorney, Agent, or Firm* — Roberts Mlotkowski Safran Cole & Calderon, P.C.

(57) ABSTRACT

In a vehicle door mirror device, a main unit supports a secondary unit via a mirror holder, and the secondary unit supports a secondary mirror. For this reason, by actuating the main unit to tilt the secondary mirror via the mirror holder and the secondary unit and simultaneously actuating the secondary unit to tilt the secondary mirror, the tilting speed of the secondary mirror can be increased.

7 Claims, 5 Drawing Sheets

(56) References Cited

U.S. PATENT DOCUMENTS 6,672,728 B1    1/2004  Su et al.
2002/0072026 A1* 6/2002 Lynam .................... B60R 1/082
                                                      432/77

FOREIGN PATENT DOCUMENTS

| JP | 06-278537 A    | 1/1994 |
| JP | 2003-081016 A  | 3/2003 |
| JP | 2009-154567 A  | 7/2009 |
| JP | 2009-184637 A  | 8/2009 |

OTHER PUBLICATIONS

Office Action issued in a corresponding Japanese application No. 2014-049285 dated Aug. 22, 2017.
Office Action issued in a corresponding Japanese application No. 2014-049285 dated Jan. 23, 2018.

* cited by examiner

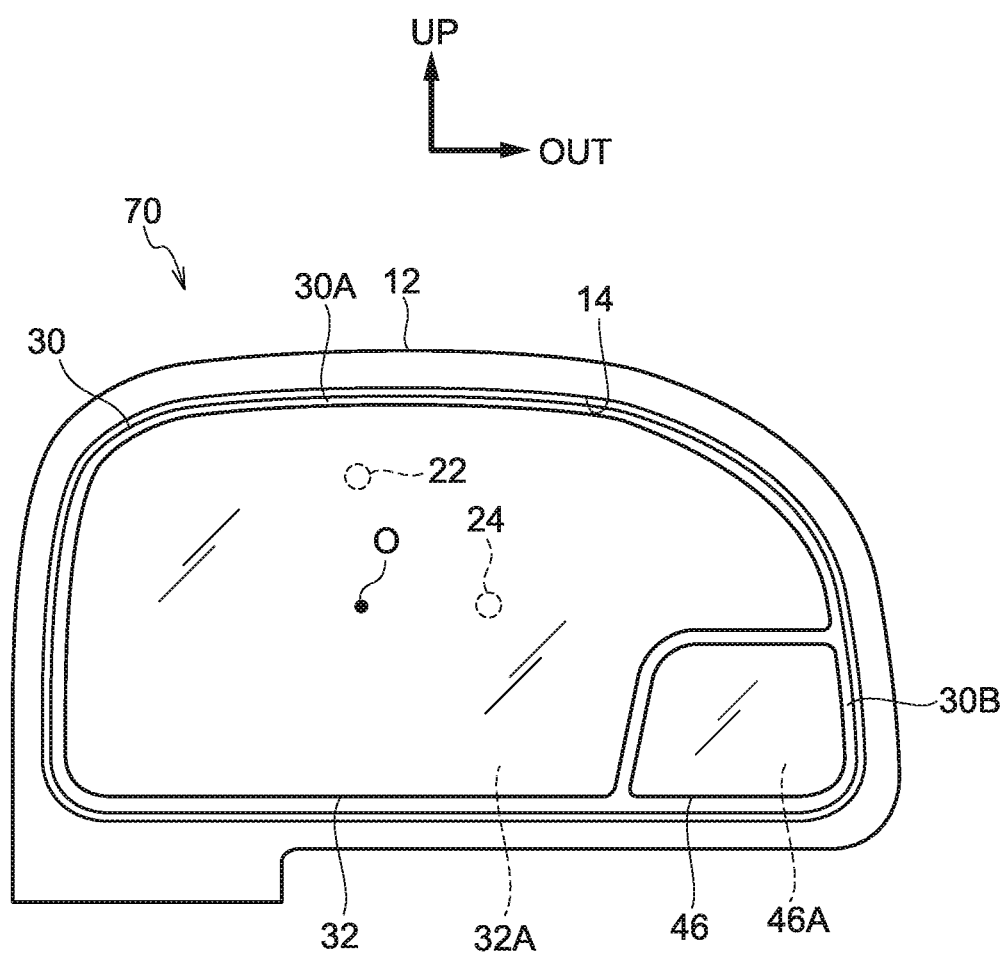

VEHICLE MIRROR DEVICE

CROSS-REFERENCE TO RELATED APPLICATIONS

The present application is a U.S. National Phase of PCT/JP2015/054851 filed on Feb. 20, 2015 claiming priority to Japanese Patent application No. 2014-049285 filed Mar. 12, 2014. The disclosure of the PCT Application is hereby incorporated by reference into the present Application.

TECHNICAL FIELD

The present invention relates to a vehicle mirror device that tilts a first mirror and a second mirror disposed in a vehicle.

BACKGROUND ART

In the rearview mirror disclosed in the specification of Chinese Utility Model Publication No. 202,163,359, a first drive mechanism tilts a first mirror and a second drive mechanism tilts a second mirror.

In this connection, in this rearview mirror, the first drive mechanism and the second drive mechanism are separately supported in a visor.

Here, in this rearview mirror, it is preferred that the tilting speed of the second mirror, for example, be able to be increased.

SUMMARY OF INVENTION

Technical Problem

In view of the circumstances described above, it is an object of the present invention to obtain a vehicle mirror device with which the tilting speed of the second mirror can be increased.

Solution to Problem

A vehicle mirror device of a first aspect of the present invention comprises: a first mirror that is disposed in a vehicle; a first tilting mechanism that supports the first mirror, an angle of a mirror surface of the first mirror being adjusted as a result of the first tilting mechanism tilting the first mirror; a second mirror that is disposed in the vehicle; and a second tilting mechanism that is supported by the first tilting mechanism and supports the second mirror, an angle of a mirror surface of the second mirror being adjusted as a result of the first tilting mechanism tilting the second mirror and the angle of the mirror surface of the second mirror being adjusted as a result of the second tilting mechanism tilting the second mirror.

In the vehicle mirror device of the first aspect of the present invention, the first tilting mechanism supports the first mirror, and the angle of the mirror surface of the first mirror is adjusted as a result of the first tilting mechanism tilting the first mirror. Moreover, the second tilting mechanism supports the second mirror, and the angle of the mirror surface of the second mirror is adjusted as a result of the second tilting mechanism tilting the second mirror.

Here, the first tilting mechanism supports the second tilting mechanism, and the angle of the mirror surface of the second mirror is adjusted as a result of the first tilting mechanism tilting the second mirror. For this reason, the tilting speed of the second mirror can be increased as a result of the first tilting mechanism tilting the second mirror and the second tilting mechanism tilting the second mirror.

A vehicle mirror device of a second aspect of the present invention is the vehicle mirror device of the first aspect of the present invention, wherein a tilting center of the second mirror is placed on one side of a center of the mirror surface of the second mirror.

In the vehicle mirror device of the second aspect of the present invention, the tilting center of the second mirror is placed on one side of the center of the mirror surface of the second mirror. For this reason, the viewing range provided by the second mirror can be changed a great extent to one side by tilting the second mirror.

A vehicle mirror device of a third aspect of the present invention is the vehicle mirror device of the first aspect or the second aspect of the present invention, wherein the second mirror is placed on an obverse side of the first mirror.

In the vehicle mirror device of the third aspect of the present invention, the second mirror is placed on the obverse side of the first mirror. For this reason, the view provided by the second mirror can be kept from being limited.

A vehicle mirror device of a fourth aspect of the present invention is the vehicle mirror device of any one of the first aspect to the third aspect of the present invention, wherein horizontal direction positions of a position where the first mirror is actuated by the first tilting mechanism and a tilting center of the second mirror coincide with each other.

In the vehicle mirror device of the fourth aspect of the present invention, the horizontal direction positions of the position where the first mirror is actuated by the first tilting mechanism and the tilting center of the second mirror coincide with each other. For this reason, chatter of the second mirror can be effectively controlled.

BRIEF DESCRIPTION OF DRAWINGS

FIG. 5 is a front view, seen from the vehicle rear side, showing a vehicle door mirror device pertaining to a third embodiment of the present invention.

DESCRIPTION OF EMBODIMENTS

[First Embodiment]

Figure 1:
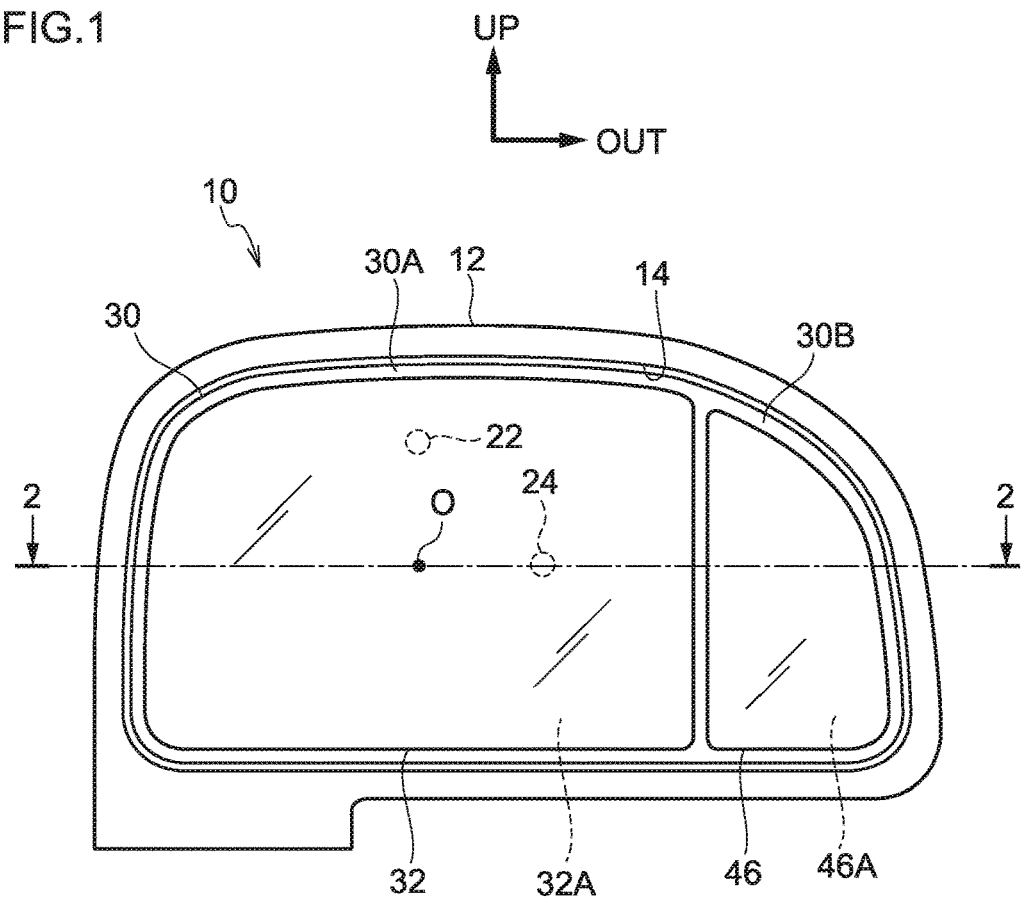
FIG. 1 is a front view, seen from a vehicle rear side, showing a vehicle door mirror device pertaining to a first embodiment of the present invention.
Figure 2:
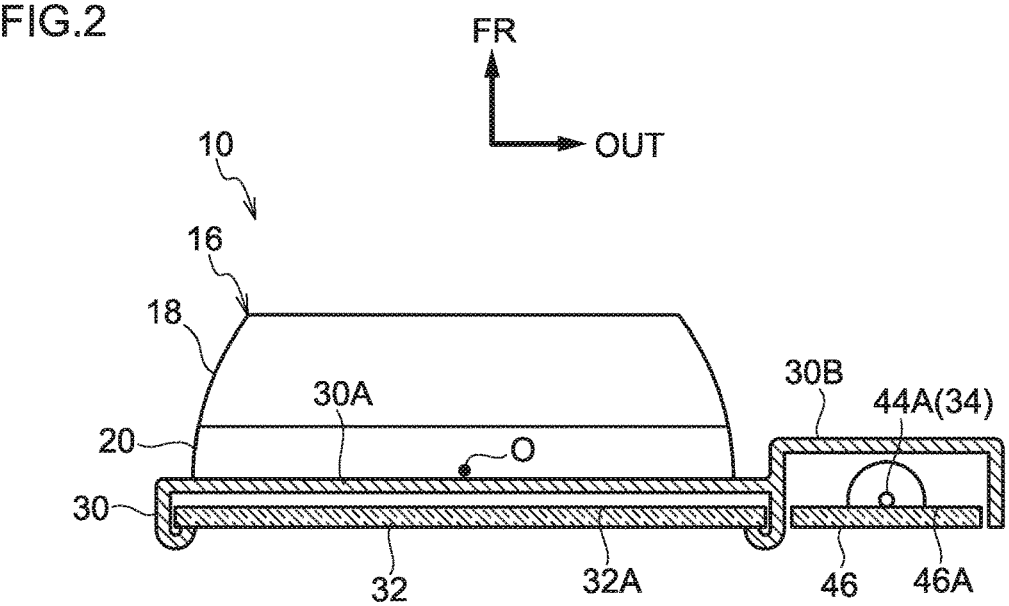
FIG. 2 is a sectional view (a sectional view along line 2-2 of FIG. 1), seen from above, showing main portions of the vehicle door mirror device pertaining to the first embodiment of the present invention.

In FIG. 1 a vehicle door mirror device 10 pertaining to a first embodiment to which the vehicle mirror device of the present invention has been applied is shown by way of a front view seen from the vehicle rear side, and in FIG. 2 main portions of the vehicle door mirror device 10 are shown by way of a sectional view (a sectional view along line 2-2 of FIG. 1) seen from above. It should be noted that, in the drawings, arrow FR indicates the vehicle forward direction, arrow OUT indicates an outward direction (vehicle rightward direction) in the vehicle width direction, and arrow UP indicates the upward direction.

As shown in FIG. 1, the vehicle door mirror device 10 pertaining to the present embodiment is equipped with a stay (not shown in the drawings) serving as an installation member, and the stay is secured to the outside of the front end of the upward and downward direction middle portion of a door (a front door, a vehicle body side) of the vehicle; thus the vehicle door mirror device 10 is installed on the door. The stay supports, on its upper side, a substantially cuboid container-shaped visor 12 serving as a housing member, and the visor 12 projects outward in the vehicle width direction with respect to the stay. A substantially rectangular opening 14 is formed in the vehicle rear side wall of the visor 12, and the opening 14 makes the inside of the visor 12 open in the vehicle rearward direction.

Inside the visor 12 is disposed an electrically powered main unit 16 (a first mirror surface angle adjustment device) serving as a first tilting mechanism shown in FIG. 2.

A substantially hemispherical container-shaped case 18 serving as a support portion is disposed in the vehicle front side section of the main unit 16, and the inside of the case 18 opens in the vehicle rearward direction. The case 18 is supported in the visor 12, and because of this the main unit 16 is supported in the visor 12.

A substantially bottomed round tube-shaped tilting tube 20 serving as a first tilting portion is disposed in the vehicle rear side section of the main unit 16, and a substantially disc-shaped bottom wall is disposed on the vehicle rear side end of the tilting tube 20. The bottom wall of the tilting tube 20 is tiltably (swingably, turnably) held in the case 18, and the tilting tube 20 is tiltable with respect to the case 18 about a center O of the bottom wall. The diameter of the peripheral wall of the tilting tube 20 gradually becomes smaller heading in the vehicle forward direction, and the peripheral wall of the tilting tube 20 is slidable with respect to the peripheral wall of the case 18.

Inside the case 18 are secured an up/down motor and an in/out motor (not shown in the drawings) serving as first tilting means (motors), and an up/down rod 22 and an in/out rod 24 (see FIG. 1) that are rod-shaped and serve as actuating members are connected via gear mechanisms (not shown in the drawings) to the up/down motor and the in/out motor, respectively. The up/down rod 22 and the in/out rod 24 are held so as to be slidable (movable) in the vehicle forward and rearward direction (axial direction) inside the case 18, with the distal end (vehicle rear side end) of the up/down rod 22 being turnably held on the bottom wall of the tilting tube 20 on the upper side (may also be the lower side) of the center O of the bottom wall of the tilting tube 20, and with the distal end (vehicle rear side end) of the in/out rod 24 being turnably held on the bottom wall of the tilting tube 20 on the vehicle width direction outside (may also be the vehicle width direction inside) of the center O of the bottom wall of the tilting tube 20.

The up/down motor and the in/out motor are electrically connected to an ECU 26 (a mirror ECU, see FIG. 3A) serving as control means inside the visor 12 or on the vehicle body side, and an adjustment operation device 28 (see FIG. 3A) serving as operating means in the vehicle is electrically connected to the ECU 26. The adjustment operation device 28 allows an occupant (particularly a driver) of the vehicle to perform an operation (a first operation) with respect to the main unit 16, and when the operation with respect to the main unit 16 has been performed via the adjustment operation device 28, the main unit 16 is actuated and at least one of the up/down motor or the in/out motor is driven by the control of the ECU 26 so that at least one of the up/down rod 22 or the in/out rod 24 is slid in the vehicle forward and rearward direction and the tilting tube 20 is tilted with respect to the case 18.

A substantially rectangular plate-shaped mirror holder 30 serving as a support member is detachably attached to the vehicle rear side of the bottom wall of the tilting tube 20, and the mirror holder 30 is housed in the neighborhood of the opening 14 inside the visor 12.

The section of the mirror holder 30 other than the vehicle width direction outside end portion is a substantially bottomed rectangular frame-shaped main holder 30A serving as a first support portion, and the inside of the main holder 30A opens in the vehicle rearward direction. A substantially rectangular plate-shaped main mirror 32 serving as a first mirror is held (secured) inside the main holder 30A, and a mirror surface 32A (the obverse surface of a reflection film on the reverse side) of the main mirror 32 faces the vehicle rearward direction, so that the occupant can see in the vehicle rearward direction by means of the main mirror 32 (the mirror surface 32A). Furthermore, the surface center (centroid) of the mirror surface 32A opposes the center O of the bottom wall of the tilting tube 20 in the vehicle forward and rearward direction.

As mentioned above, when the main unit 16 is actuated and the tilting tube 20 is tilted with respect to the case 18, the mirror holder 30 and the main mirror 32 are tilted integrally with the tilting tube 20 and the angle of the mirror surface 32A of the main mirror 32 (the direction that the mirror surface 32A faces) is adjusted. Furthermore, when the main unit 16 is actuated and the up/down motor is driven, the up/down rod 22 is slid in the vehicle forward and rearward direction so that the main mirror 32 is tilted in the upward and downward direction and the angle of the mirror surface 32A of the main mirror 32 is adjusted in the upward and downward direction. Moreover, when the main unit 16 is actuated and the in/out motor is driven, the in/out rod 24 is slid in the vehicle forward and rearward direction so that the main mirror 32 is tilted in the vehicle width direction and the angle of the mirror surface 32A of the main mirror 32 is adjusted in the vehicle width direction.

Figure 3A:
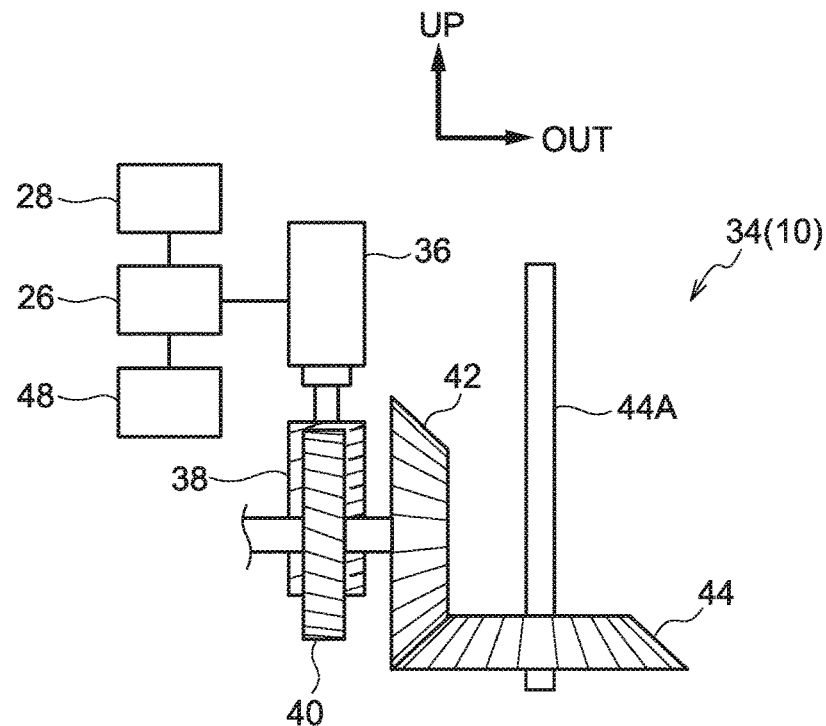
FIG. 3A is a front view, seen from the vehicle rear side, showing a secondary unit in the vehicle door mirror device pertaining to the first embodiment of the present invention.
Figure 3B:
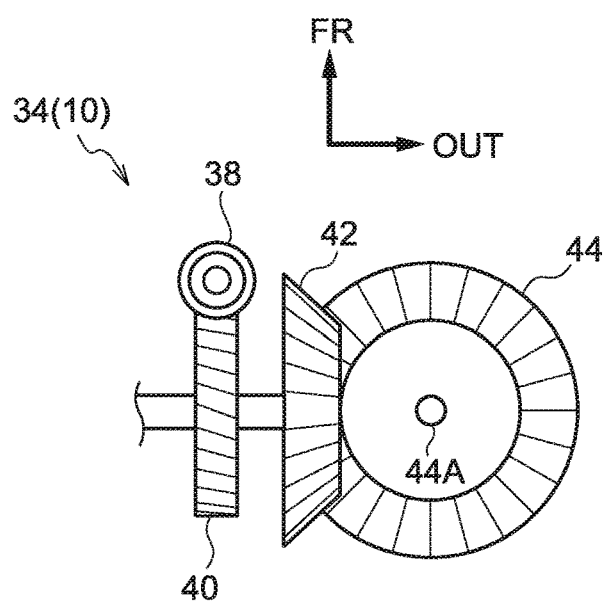
FIG. 3B is a plan view, seen from above, showing the secondary unit in the vehicle door mirror device pertaining to the first embodiment of the present invention.

The vehicle width direction outside end portion of the mirror holder 30 is a substantially bottomed rectangular frame-shaped secondary holder 30B serving as a second support portion, and the inside of the secondary holder 30B opens in the vehicle rearward direction. An electrically powered secondary unit 34 (a second mirror surface angle adjustment device) serving as a second tilting mechanism shown in FIG. 3A and FIG. 3B is disposed inside the secondary holder 30B.

A secondary motor 36 serving as second tilting means (motor) is disposed in the secondary unit 34, and the secondary motor 36 is secured inside the secondary holder 30B and has an output shaft placed parallel to the upward and downward direction. An output gear 38 is coaxially secured to the output shaft of the secondary motor 36, and the output gear 38 is a worm. An input gear 40 is meshed with the output gear 38, and the input gear 40 is a worm wheel. The central shaft of the input gear 40 is rotatably supported inside the secondary holder 30B, and the central shaft of the input gear 40 is placed parallel to the vehicle width direction. A transmission gear 42 is coaxially secured to the central shaft of the input gear 40, and the transmission gear 42 is a bevel gear. An actuating gear 44 is meshed with the transmission gear 42, and the actuating gear 44 is a bevel gear. A central shaft 44A serving as a second tilting portion of the actuating gear 44 is rotatably supported inside the secondary holder 30B, and the central shaft 44A of the actuating gear 44 is placed parallel to the upward and downward direction.

The secondary motor 36 is electrically connected to the ECU 26. The adjustment operation device 28 allows the occupant to perform an operation (a second operation) with respect to the secondary unit 34, and when the operation with respect to the secondary unit 34 has been performed via the operation adjustment device 28, the secondary unit 34 is actuated and the secondary motor 36 is driven by the control of the ECU 26 so that the output gear 38, the input gear 40, the transmission gear 42, and the actuating gear 44 are rotated and the central shaft 44A of the actuating gear 44 is rotated.

As shown in FIG. 2, a substantially rectangular plate-shaped secondary mirror 46 (auxiliary mirror) serving as a second mirror is secured to the vehicle rear side of the central shaft 44A of the actuating gear 44, and a mirror surface 46A (the obverse surface of a reflection film on the reverse side) of the secondary mirror 46 faces the vehicle rearward direction, so that the occupant can see in the vehicle rearward direction by means of the secondary mirror 46 (the mirror surface 46A). Furthermore, the surface center (centroid) of the mirror surface 46A opposes the central shaft 44A of the actuating gear 44 in the vehicle forward and rearward direction.

As mentioned above, when the secondary mirror 34 is actuated and the central shaft 44A of the actuating gear 44 is rotated, the secondary mirror 46 is tilted in the vehicle width direction integrally with the central shaft 44A of the actuating gear 44 and the angle of the mirror surface 46A (the direction that the mirror surface 46A faces) of the secondary mirror 46 is adjusted in the vehicle width direction.

As shown in FIG. 3A, a detection device 48 serving as detecting means is electrically connected to the ECU 26, and the detection device 48 can detect dangerous objects (e.g., another vehicle) on the vehicle width direction outside of the vehicle door mirror device 10 side of the vehicle.

Next, the action of the present embodiment will be described.

In the vehicle door mirror device 10 having the configuration described above, when the operation with respect to the main unit 16 has been performed via the adjustment operation device 28, the main unit 16 is actuated and at least one of the up/down motor or the in/out motor is driven by the control of the ECU 26 so that at least one of the up/down rod 22 or the in/out rod 24 is slid in the vehicle forward and rearward direction. For this reason, the tilting tube 20, the mirror holder 30, and the main mirror 32 are tilted in at least one of the upward and downward direction or the vehicle width direction with respect to the case 18 and the main mirror 32 is tilted to a normal position so that the angle of the mirror surface 32A of the main mirror 32 is adjusted and the occupant's viewing range provided by the main mirror 32 is adjusted.

Furthermore, when the operation with respect to the secondary unit 34 has been performed via the adjustment operation device 28, the secondary unit 34 is actuated and the secondary motor 36 is driven by the control of the ECU 26 so that the output gear 38, the input gear 40, the transmission gear 42, and the actuating gear 44 are rotated. For this reason, the secondary mirror 46 is tilted in the vehicle width direction integrally with the central shaft 44A of the actuating gear 44 and the secondary mirror 46 is tilted to a normal position so that the angle of the mirror surface 46A of the secondary mirror 46 is adjusted and the occupant's viewing range provided by the secondary mirror 46 is adjusted.

When the detection device 48 has detected a dangerous object on the vehicle width direction outside of the vehicle door mirror device 10 side of the vehicle (a predetermined chance), the main unit 16 is actuated and the in/out motor is driven by the control of the ECU 26 so that the in/out rod 24 is slid in the vehicle forward direction and the tilting tube 20, the mirror holder 30, and the main mirror 32 are tilted outward in the vehicle width direction with respect to the case 18. Moreover, at this time, the secondary unit 34 is actuated and the secondary motor 36 is driven by the control of the ECU 26 so that the actuating gear 44 is rotated and the secondary mirror 46 is tilted outward in the vehicle width direction integrally with the central shaft 44A of the actuating gear 44. For this reason, the main mirror 32 (including the mirror holder 30) and the secondary mirror 46 are tilted to a changed position, the mirror surface 32A of the main mirror 32 is made to face outward in the vehicle width direction, and the mirror surface 46A of the secondary mirror 46 is made to face outward in the vehicle width direction, so that the occupant can see the dangerous object by means of the secondary mirror 46 (or so that the occupant can see the dangerous object by means of the main mirror 32 and the secondary mirror 46).

Thereafter, when the detection device 48 no longer detects the dangerous object, the main unit 16 is actuated and the in/out motor is driven by the control of the ECU 26 so that the in/out rod 24 is slid in the vehicle rearward direction and the tilting tube 20, the mirror holder 30, and the main mirror 32 are tilted inward in the vehicle width direction with respect to the case 18. Moreover, at this time, the secondary unit 34 is actuated and the secondary motor 36 is driven by the control of the ECU 26 so that the actuating gear 44 is rotated and the secondary mirror 46 is tilted inward in the vehicle width direction integrally with the central shaft 44A of the actuating gear 44. For this reason, the main mirror 32 and the secondary mirror 46 are tilted (returned) to the normal position.

Here, the main unit 16 supports the secondary unit 34 via the mirror holder 30, and the secondary unit 34 supports the secondary mirror 46. For this reason, by actuating the main unit 16 to tilt the secondary mirror 46 via the mirror holder 30 and the secondary unit 34 and simultaneously actuating the secondary unit 34 to tilt the secondary mirror 46, the tilting speed of the secondary mirror 46 can be increased and the speed with which the angle of the mirror surface 46A of the secondary mirror 46 is adjusted can be increased.

In particular, when the detection device 48 has detected a dangerous object, the main unit 16 is actuated to tilt the secondary mirror 46 outward in the vehicle width direction and simultaneously the secondary unit 34 is actuated to tilt the secondary mirror 46 outward in the vehicle width direction. Because of this, the secondary mirror 46 can be tilted to the changed position at a high speed and the occupant can promptly see the dangerous object by means of the secondary mirror 46.

Moreover, thereafter, when the detection device 48 no longer detects the dangerous object, the main unit 16 is actuated to tilt the secondary mirror 46 inward in the vehicle width direction and simultaneously the secondary unit 34 is actuated to tilt the secondary mirror 46 inward in the vehicle width direction. Because of this, the secondary mirror 46 can be tilted to the normal position at a high speed and the secondary mirror 46 can be promptly returned to the normal position.

[Second Embodiment]

Figure 4:
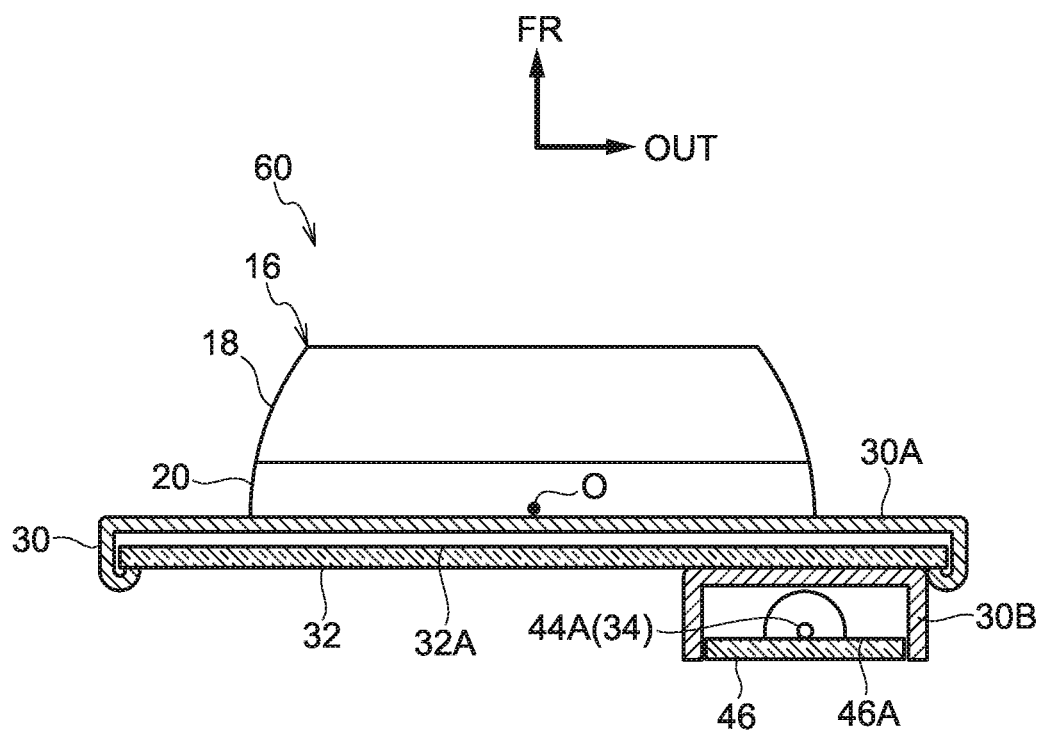
FIG. 4 is a sectional view (a sectional view at the position of line 2-2 of FIG. 1), seen from above, showing main portions of a vehicle door mirror device pertaining to a second embodiment of the present invention.

In FIG. 4 the main portions of a vehicle door mirror device 60 pertaining to a second embodiment to which the vehicle mirror device of the present invention has been applied are shown by way of a sectional view (a sectional view at the position of line 2-2 of FIG. 1).

The vehicle door mirror device 60 pertaining to the present embodiment has substantially the same configuration as that of the first embodiment but differs in the following respects.

As shown in FIG. 4, in the vehicle door mirror device 60 pertaining to the present embodiment, the main holder 30A and the secondary holder 30B of the mirror holder 30 are separate from each other. The main holder 30A in enlarged outward in the vehicle width direction, and the main mirror 32 is enlarged outward in the vehicle width direction together with the main holder 30A. The secondary holder 30B is secured to the vehicle rear side (the obverse side) of the vehicle width direction outside end portion of the main mirror 32, and the secondary mirror 46 is placed on the vehicle rear side of the main mirror 32.

Here, in the present embodiment also, the same action and effects as those of the first embodiment can be achieved.

Moreover, the secondary mirror 46 is placed on the vehicle rear side of the main mirror 32. For this reason, the secondary mirror 46 can be kept from being moved a great extent to the vehicle front side of the opening 14 inside the visor 12, and the occupant's view provided by the secondary mirror 46 can be kept from being limited by the peripheral wall around the opening 14 of the visor 12.

In particular, even when the detection device 48 has detected a dangerous object and the main mirror 32 and the secondary mirror 46 have been tilted outward in the vehicle width direction to the changed position, the secondary mirror 46 can be kept from being moved a great extent to the vehicle front side of the opening 14 inside the visor 12, and the occupant's view of the dangerous object provided by the secondary mirror 46 can be kept from being limited by the peripheral wall around the opening 14 of the visor 12.

[Third Embodiment]

In FIG. 5 a vehicle door mirror device 70 pertaining to a third embodiment to which the vehicle mirror device of the present invention has been applied is shown by way of a front view seen from the vehicle rear side.

The vehicle door mirror device 70 pertaining to the present embodiment has substantially the same configuration as that of the first embodiment but differs in the following respects.

As shown in FIG. 5, in the vehicle door mirror device 70 pertaining to the present embodiment, the upper side section of the main holder 30A of the mirror holder 30 is enlarged outward in the vehicle width direction, and the upper side section of the main mirror 32 is enlarged outward in the vehicle width direction together with the main holder 30A.

The secondary holder 30B of the mirror holder 30 is disposed in the lower side section of the vehicle width direction outside end portion of the mirror holder 30, the upward and downward direction dimension of the secondary mirror 46 is reduced, and the secondary mirror 46 is placed inside the secondary holder 30B.

Here, in the present embodiment also, the same action and effects as those of the first embodiment can be achieved.

It should be noted that the present embodiment is obtained by changing in the first embodiment the mirror holder 30, the main mirror 32, and the secondary mirror 46. However, in the second embodiment the mirror holder 30, the main mirror 32, and the secondary mirror 46 may also be changed like in the present embodiment. In this case, the upward and downward direction dimensions of the secondary holder 30B of the mirror holder 30 and the secondary mirror 46 are reduced.

[Fourth Embodiment]

Figure 6A:
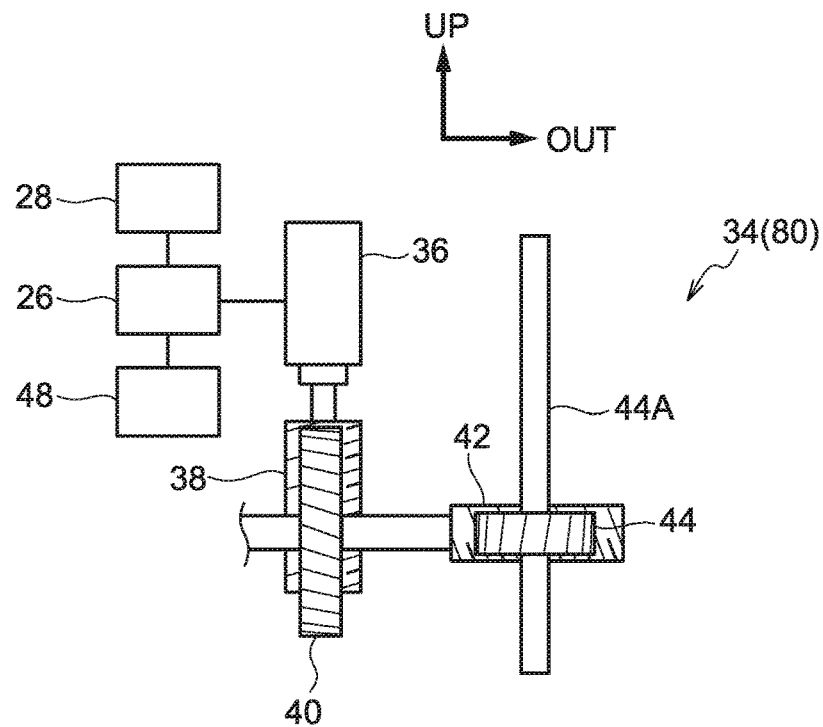
FIG. 6A is a front view, seen from the vehicle rear side, showing the secondary unit in a vehicle door mirror device pertaining to a fourth embodiment of the present invention.
Figure 6B:
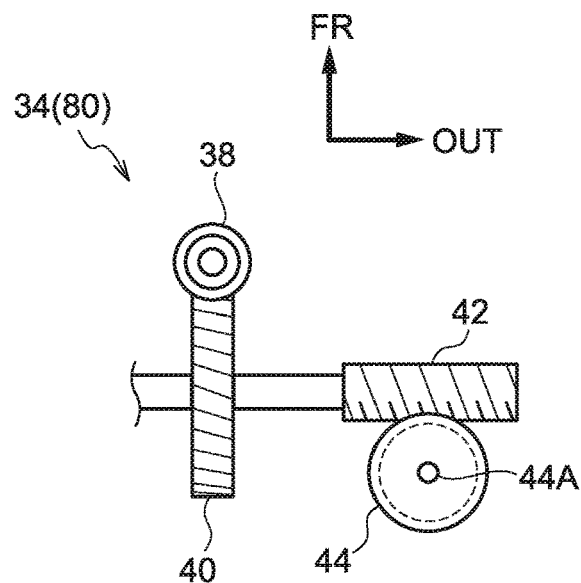
FIG. 6B is plan view, seen from above, showing the secondary unit in the vehicle door mirror device pertaining to the fourth embodiment of the present invention.

In FIG. 6A the main portions of a vehicle door mirror device 80 pertaining to a fourth embodiment to which the vehicle mirror device of the present invention has been applied are shown by way of a front view seen from the vehicle rear side, and in FIG. 6B the main portions of the vehicle door mirror device 80 are shown by way of a plan view seen from above.

The vehicle door mirror device 80 pertaining to the present embodiment has substantially the same configuration as that of the first embodiment but differs in the following respects.

As shown in FIG. 6A and FIG. 6B, in the vehicle door mirror device 80 pertaining to the present embodiment, in the secondary unit 34 the transmission gear 42 is a worm and the actuating gear 44 is a worm wheel.

Here, in the present embodiment also, the same action and effects as those of the first embodiment can be achieved.

It should be noted that the present embodiment is obtained by changing in the first embodiment the transmission gear 42 and the actuating gear 44. However, in the second embodiment and the third embodiment the transmission gear 42 and the actuating gear 44 may also be changed like in the present embodiment.

Furthermore, in the first embodiment to the fourth embodiment, the secondary mirror 46 (the secondary holder 30B) is placed on the vehicle width direction outside of the main mirror 32 (the main holder 30A). However, the secondary mirror 46 (the secondary holder 30B) may also be placed on a side (e.g., the upper side, the lower side, or the vehicle width direction inside) of the main mirror 32 (the main holder 30A) other than the vehicle width direction outside.

Moreover, in the first embodiment to the fourth embodiment, the secondary mirror 46 is tiltable in the vehicle width direction. However, it suffices for the secondary mirror 46 to be tiltable in at least one of the upward and downward direction or the vehicle width direction.

Furthermore, in the first embodiment to the fourth embodiment, the tilting center of the secondary mirror 46 (the central shaft 44A of the actuating gear 44) opposes the surface center of the mirror surface 46A of the secondary mirror 46 in the vehicle forward and rearward direction. However, the tilting center of the secondary mirror 46 may also be placed on one side of the surface center of the mirror surface 46A of the secondary mirror 46. Because of this, the occupant's viewing range provided by the secondary mirror 46 can be changed a great extent to one side by tilting the secondary mirror 46. In particular, by placing the tilting center of the secondary mirror 46 (the central shaft 44A of the actuating gear 44) on the vehicle width direction outside of the surface center of the mirror surface 46A of the secondary mirror 46, the occupant's viewing range provided by the secondary mirror 46 can be changed a great extent outward in the vehicle width direction by tilting the secondary mirror 46 outward in the vehicle width direction, and the placement range of the dangerous object that the occupant can see by means of the secondary mirror 46 can be widened.

Moreover, in the first embodiment to the fourth embodiment, when the detection device 48 has detected a dangerous object, the main mirror 32 and the secondary mirror 46 are tilted outward in the vehicle width direction by the control of the ECU 26. However, it suffices for the main mirror 32 and the secondary mirror 46 to be tilted in at least one of the upward and downward direction or the vehicle width direction by the control of the ECU 26 at the predetermined chance. For example, the main mirror 32 and the secondary mirror 46 may also be tilted outward in the vehicle width direction by the control of the ECU 26 when a direction indicator (operation device) in the vehicle has been operated. Moreover, the main mirror 32 and the secondary mirror 46 may also be tilted downward by the control of the ECU 26 when the shift range of an automatic transmission of the vehicle has been changed to the reverse range.

Furthermore, in the first embodiment to the fourth embodiment, the tilting center of the secondary mirror 46 (the central shaft 44A of the actuating gear 44) is placed on the vehicle width direction outside of the position where the main mirror 32 is actuated by the main unit 16 (the positions where the up/down rod 22 and the in/out rod 24 are coupled to the bottom wall of the tilting tube 20). However, the vehicle width direction (horizontal direction) positions of the tilting center of the secondary mirror 46 and the position where the main mirror 32 is actuated by the main unit 16 (the position where at least one of the up/down rod 22 or the in/out rod 24 is coupled to the bottom wall of the tilting tube 20) may also coincide with each other. Because of this, the secondary mirror 46 can be effectively supported also by at least one of the up/down rod 22 or the in/out rod 24, so that chatter of the secondary mirror 46 when the vehicle travels can be effectively controlled.

Moreover, in the embodiments, the present invention is applied to the vehicle door mirror devices 10, 60, 70, and 80. However, the present invention may also be applied to other car exterior and car interior mirror devices.

The disclosure of Japanese Patent Application No. 2014-49285 filed on Mar. 12, 2014, is incorporated in its entirety by reference herein.

REFERENCE SIGNS LIST

10 Vehicle Door Mirror Device (Vehicle Mirror Device)
16 Main Unit (First Tilting Mechanism)
32 Main Mirror (First Mirror)
32A Mirror Surface
34 Secondary Unit (Second Tilting Mechanism)
46 Secondary Mirror (Second Mirror)
46A Mirror Surface

The invention claimed is:

1. A vehicle mirror device comprising:
a first mirror that is disposed in a vehicle;
a first tilting mechanism that is electrically powered, and that supports the first mirror, an angle of a mirror surface of the first mirror being adjusted as a result of the first tilting mechanism tilting the first mirror;
a second mirror that is disposed in the vehicle; and
a second tilting mechanism that is electrically powered, and that is tiltably supported by the first tilting mechanism and supports the second mirror, an angle of a mirror surface of the second mirror being adjusted as a result of the first tilting mechanism tilting the second mirror by tilting the second tilting mechanism with respect to the first tilting mechanism and the angle of the mirror surface of the second mirror being adjusted as a result of the second tilting mechanism tilting the second mirror.

2. The vehicle mirror device according to claim 1, wherein a tilting center of the second mirror is placed on one side of a center of the mirror surface of the second mirror.

3. The vehicle mirror device according to claim 1, wherein the second mirror is placed on an obverse side of the first mirror.

4. The vehicle mirror device according to claim 1, wherein horizontal direction positions of a position where the first mirror is actuated by the first tilting mechanism and a tilting center of the second mirror coincide with each other.

5. The vehicle mirror device according to claim 1, wherein the mirror holder is a one-piece mirror holder having first and second support portions for supporting the first and second mirrors, respectively.

6. The vehicle mirror device according to claim 1, wherein the mirror holder includes separate first and second support portions for supporting the first and second mirrors, respectively, and wherein the second support portion is mounted on the first mirror.

7. The vehicle mirror device according to claim 1, further comprising a single mirror holder that holds both the first and second mirrors,
wherein the first tilting mechanism is connected to the single mirror holder such that the first tilting mechanism simultaneously adjusts the mirror surface of both said first and second mirrors by a same angle, and
wherein the second tilting mechanism adjusts only the angle of the mirror surface of the second mirror.

* * * * *